United States Patent
Homer et al.

(10) Patent No.: US 6,353,622 B1
(45) Date of Patent: Mar. 5, 2002

(54) PROCESS FOR MAINTAINING THE MICROSYNCHRONOUS OPERATION OF DOUBLE INFORMATION-PROCESSING UNITS

(75) Inventors: Russell Homer; Helmut Brazdrum, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/043,985

(22) PCT Filed: Sep. 26, 1996

(86) PCT No.: PCT/DE96/01843
§ 371 Date: Mar. 27, 1998
§ 102(e) Date: Mar. 27, 1998

(87) PCT Pub. No.: WO97/13203
PCT Pub. Date: Apr. 10, 1997

(51) Int. Cl.[7] .................................................. H04J 3/06
(52) U.S. Cl. ........................................ 370/507; 370/516
(58) Field of Search .................................. 370/386, 387, 370/389, 395, 396, 400, 410, 427, 428, 429, 503, 507, 516, 517, 518; 375/357, 362, 369

(56) References Cited

U.S. PATENT DOCUMENTS

| | | | | |
|---|---|---|---|---|
| 4,759,018 A | * | 7/1988 | Buchner | 370/535 |
| 4,779,087 A | * | 10/1988 | Fukuda et al. | 340/825.05 |
| 5,065,397 A | * | 11/1991 | Shiobara | 370/453 |
| 5,117,442 A | * | 5/1992 | Hall | 375/356 |
| 5,414,696 A | * | 5/1995 | Tsuzuki et al. | 370/219 |
| 5,426,644 A | * | 6/1995 | Fujimoto | 370/535 |
| 5,550,874 A | * | 8/1996 | Lee | 375/354 |
| 5,809,255 A | * | 9/1998 | Amada et al. | 709/248 |

FOREIGN PATENT DOCUMENTS

| | | |
|---|---|---|
| DE | 42 27 118 C1 | 11/1993 |
| GB | 2 258 582 | 10/1993 |

OTHER PUBLICATIONS

Ericsson Review vol. 70, No. 1, (1993), Mikael Larsson et al. The ATM Switch Concept and the ATM Pipe Switch, pp. 12–20.

* cited by examiner

Primary Examiner—Kwang B. Yao
(74) Attorney, Agent, or Firm—Schiff Hardin & Waite

(57) ABSTRACT

The units (CTR0, CTR1) are controlled by mutually independent clock pulses (SCLK, RXCK). In order to prevent the loss of microsynchronization when information is transferred from one clock system to the other and as a result of different error situations as regards the information received by the units, the information received is temporarily stored before being passed on for processing or the result information is temporarily stored before being transmitted. If reception is error free, the units are cross-synchronized. In the absence of a synchronization signal in one partner unit owing to faulty reception, this unit rejects the information received despite the fact that it is error free.

7 Claims, 2 Drawing Sheets

FIG 2
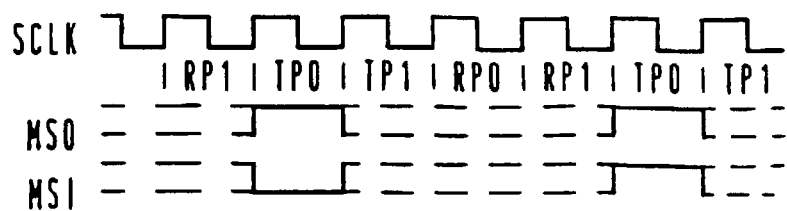
FIG 3
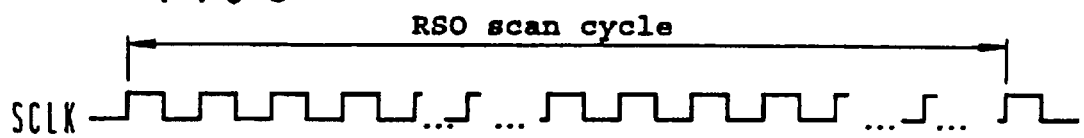
FIG 4
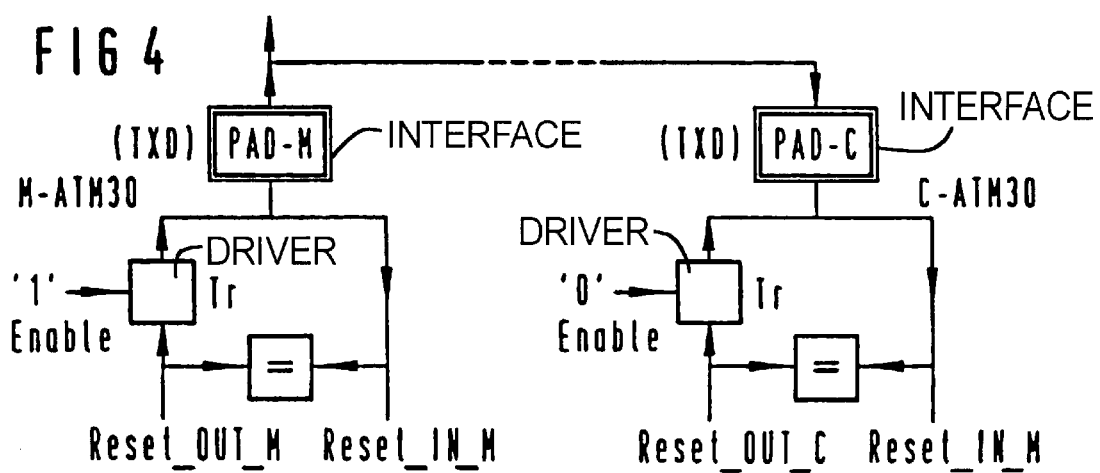

PROCESS FOR MAINTAINING THE MICROSYNCHRONOUS OPERATION OF DOUBLE INFORMATION-PROCESSING UNITS

BACKGROUND OF THE INVENTION

The information relates to a process for maintaining the microsynchronous operation of duplicated information-processing units. Accordingly, the duplicated units operate with a common internal processing clock which is independent of the clock used to receive information to be processed or used to transmit information-processing results. Such units are additionally equipped in each case with a device for error monitoring of the information received and of the information-processing results to be transmitted.

The reason for the above-mentioned duplication of the information-processing units is the aim of ensuring a high level of protection against failure and error. If information which is received in accordance with one of the clock systems mentioned is transferred to the other clock system for the purpose of processing, as it passes through the associated multivibrators the signal transfer may fluctuate by one clock period so that the microsynchronization with respect to corresponding components in the two units is disrupted and hence the protection against failure and error which is aimed at can no longer be ensured. In addition, the information fed to the units on the transmission paths is affected in different manners on the way. Even if such transmission errors can be recognized by the above-mentioned devices for monitoring the error free reception of the information to be processed, it is not sufficient to prevent the distorted information from being processed because, even then, the microsynchronous parallel operation of the units would be disrupted. The same applies for the presence of an error in the information-processing results to be transmitted.

SUMMARY OF THE INVENTION

The object of the invention, therefore, is to prevent the microsynchronization of the operation of such duplicated units from being disrupted as mentioned above.

In general terms the present invention is a process for maintaining microsynchronous parallel operation of duplicated information-processing units. The internal processing clock of each unit is mutually synchronous but independent of the clock used to receive information to be processed or used to transmit the processing results. Each unit contains a device for error monitoring of the information received and of the information results to be transmitted. The information fed to the units is temporarily stored before being processed and the corresponding result information is temporarily stored before being passed on. If the information received or the information processing results to be transmitted are error free, the units each supply a synchronization signal, indicating the appropriate processing phase and derived from the internal system clock, to the partner unit, and the start of the relevant processing phase is synchronized with this signal. In the absence of a synchronization signal on the part of the partner unit, even if information is received correctly or if distorted information is received, information processing in the affected unit is prevented or, even if an undistorted information processing result is obtained, dummy information is transmitted instead. The procedure of the invention not only ensures that the processing components of the units operate synchronously, but it also ensures that uniform relationships are maintained in the event of errors in respect of the information received and the information-processing results to be transmitted which affect only one of the units.

Other refinements of the invention are defined in the subclaims.

Provided that processing components of the units are duplicated, for the purpose of detecting hardware errors during information processing, in a master-checker configuration, the information inputs of the components are operated in parallel. Outputs of the checker component are operated as information inputs which can be fed the output signals of the master component as input signals for carrying out a comparison. Before the units exchange synchronization signals, clock edge synchronization of the processing clocks is carried out in each case between the master and the checker component of the units by exchanging synchronization signals which are likewise derived from the internal system clock. This embodiment takes as its starting point the fact that the information-processing components inside the duplicated units are duplicated, for the purpose of recognizing hardware errors, in a master-checker configuration, and specifies how a two-stage process can be used in such a case to satisfy the requirements of microsynchronization.

In a further embdiment the synchronization signals exchanged are multiplex signals comprising individual synchronization signals for the individual internal input and output interface circuits.

At startup or restart of the processing units, the repetition cycles of the demultiplexed individual synchronization signals emitted by the processing components of the units are reset by a common reset signal derived from the internal system clock.

In a further embodiment, at startup or restart, the output interface circuits of the master and checker processing components are to be reset if there is no dedicated reset signal available for the clock system which controls these output interface circuits, and the reset signal is derived from the system clock instead. The reset signal of the checker processing component is therefore derived from the output signal of the master processing component.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2 and 3 show timing diagrams for illustrating the relationships of the synchronization signals over time.

FIG. 4 shows the output ranges of a master processing component and an associated checker processing component for illustrating the relationships upon reset.

DESCRIPTION OF THE PREFERRED EMBODIMENT

Figure 1:
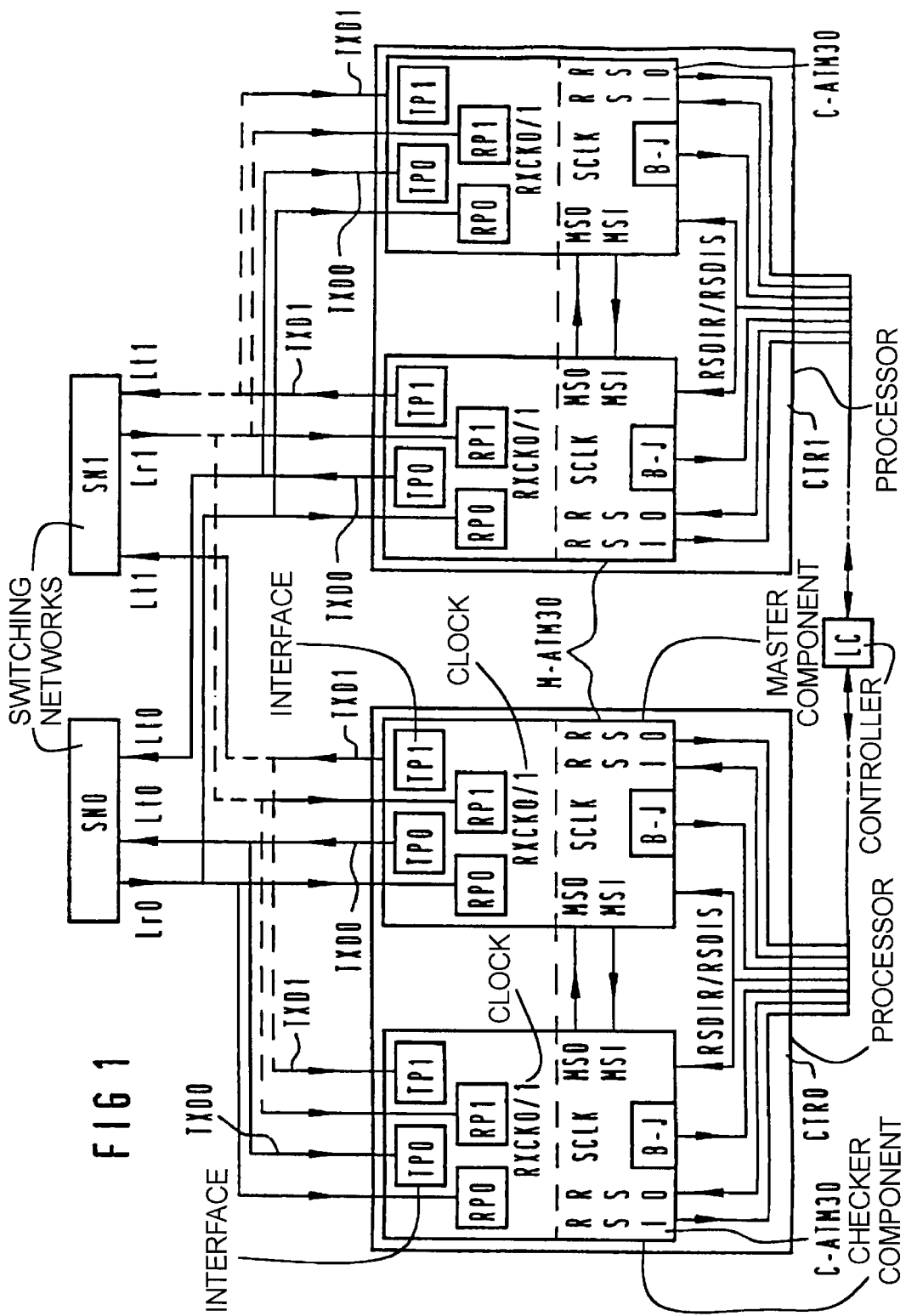
FIG. 1 shows a possible arrangement of information-processing units having processing components, to which the process according to the invention can be applied.

FIG. 1 illustrates two information-processing units CTR0 and CTR1 which may be used to process ATM information, for example. In this case, these processing units are connected to a switching network which has duplicated parts SN0 and SN1 in the case illustrated. The processing units CRT0 and CRT1 are connected, via a network of reception lines Ir0, Ir1 and transmission lines It0, It1 for transmitting ATM information, to the switching network parts SN0 and SN1 in such a way that ATM information coming from each switching network part reaches both processing units to the same extent, and that ATM information emitted by these processing units can be fed to both switching network parts SN0 and SN1 to the same extent.

The processing units CTR0 and CTR1 have in this instance two processing components C-ATM30 and M-ATM30 each which operate in a so-called master-checker configuration, i.e. the transmission outputs TP0 and TP1 in the checker processing component C-ATM30 are connected as inputs which receive, as input information, ATM transmission information emitted by the transmission outputs TP0 and TP1 of the respectively associated master processing component M-ATM30 and primarily intended to be passed on to the switching network parts SN0 and SN1. Internal comparators (not shown here) of the checker processing components compare the input signals received in this way with signals produced internally as output signals and emit an appropriate error message in the event of disparity being detected.

The ATM information coming from the switching network halves SN0 and SN1 are received with a reception clock RXCK0 and RXCK1. The ATM information received is processed with an asynchronous internal system clock SCLK which is independent of this. This different clock control of the reception range and the transmission range as well as the processing range of the processing components is illustrated by a dashed line across the processing units CTR0 and CTR1.

The signal transfer from one module of the processing components, which is controlled by one clock system, to a module which is controlled by the other clock system can fluctuate by one clock period. As a result, if no particular steps are taken, the microsynchronous parallel operation of the processing components is disrupted, which means that the parallel operation of the processing units CTR0 and CTR1 is no longer ensured either.

In order to ensure the microsynchronous parallel operation of the processing component, the information received is temporarily stored, in a manner not illustrated in more detail here, before being processed or corresponding processing results are temporarily stored before being passed on, and the instants at which the information is transferred for processing or at which information results from all the processing components are passed on are synchronized with one another by exchanging information signals. Specifically, the procedure here is such that synchronous operation is initially produced between the master and checker processing components of the two processing units by transmitting a synchronization signal MS0, indicating the processing phase and derived from the internal system clock SCLK, to the respective other processing component, and that parallel operation of the processing components from processing unit to processing unit CTR0 and CTR1 is then achieved by exchanging synchronization signals RS0 on the path via a controller LC.

FIG. 2 illustrates such a synchronization output signal MS0 which represents the synchronization input signal MSI of the respectively other processing component. FIG. 3 shows the same for the synchronization output signals RS0, exchanged between the processing units CTR0 and CTR1, which are synchronization input signals for the respectively other processing unit. In order to reduce the number of output connections, the synchronization signals MS0 and RS0 mentioned represent multiplex signals comprising individual synchronization signals for such parts of the processing components as are virtually operated in parallel.

The ATM information received may be affected by transmission errors in different ways on the path from the switching network parts SN0 and SN1 to the processing units CTR0 and CTR1. Such transmission errors are recognized by monitoring devices (not shown here) with the result that the distorted information is rejected, that is to say not passed on to processing, and that dummy information is emitted as the corresponding processing result.

The reception of distorted ATM information additionally means that a synchronization signal RS0 is not transmitted by the affected processing unit to the partner unit. In turn, this means that, even though the partner unit has received error-free ATM information, it likewise rejects this information owing to the absence of the synchronization signal expected, and hence the processing units are prevented from transmitting different ATM information.

In a startup stage or restart stage, the repetition cycles of the synchronization signals MS0 are reset by a common reset signal derived from the internal system clock SCLK.

In order for the bitwise comparison, carried out in connection with the master-checker operation, to be able to produce relevant statements via the output interface circuits TP0 and TP1, these output interface circuits must also be reset at startup or restart. These interface circuits are controlled by the clock RXCK0 or RXCK1 which controls the transmission of ATM information. However, since only the reset signal mentioned, which is derived from the internal system clock SCLK, is available, the procedure here, on the basis of a further refinement of the invention, is such that with the resetting of the output interface circuits, checker processing component C-ATM30 is reset not, like the master processing component M-ATM30, with a reset signal based on the system clock, (although it has this available to it, see the signal Reset-OUT-C in FIG. 4 which cannot be passed on, however, owing to Enable '0' at the driver Tr), but with a reset signal. The reset signal is derived from the output signal, which the master processing component M-ATM30 transmits, via its output interface circuit PAD-M, to the output interface circuit PAD-C, operated as an input, of the master processing component, (see the signal Reset-IN-M at C-ATM30 in FIG. 4).

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for maintaining microsynchronous parallel operation of duplicated information-processing units, an internal processing clock of each unit being mutually synchronous but independent of a clock used to receive information to be processed or used to transmit processed information results, and each unit containing a device for error monitoring of the information received and of the information results to be transmitted, comprising the steps of:

temporarily storing information received by the units before being processed and temporarily storing corresponding result information;

supplying by each of the units, if the information received or the result information to be transmitted are error free, a synchronization signal, indicating processing phase and derived from an internal system clock, to one another of the units, and synchronizing a start of a processing phase with the synchronization signal;

preventing, in an absence of a synchronization signal, even if information is received correctly or if distorted information is received, information processing in the affected unit or, even if an undistorted information processing result is obtained, transmitting dummy information instead.

2. The process as claimed in claim 1, wherein processing components of the units are duplicated, for detecting hardware errors during information processing, in a master-checker configuration in which information inputs of the components are operated in parallel and the outputs of the checker component are operated as information inputs which can be fed the output signals of the master component as input signals for carrying out a comparison, and wherein before the units exchange synchronization signals, clock edge synchronization of the processing clocks is carried out in each unit between a master component and a checker component of the units by exchanging synchronization signals which are likewise derived from the internal system clock.

3. The process as claimed in claim 2, wherein the synchronization signals are multiplex signals having individual synchronization signals for individual internal input and output interface circuits.

4. The process as claimed in claim 3, wherein, in a startup stage, repetition cycles of the multiplexed individual synchronization signals emitted by the processing components of the units are reset by a common reset signal derived from the internal system clock.

5. The process as claimed in claim 4, wherein output interface circuits of the checker processing components, which are controlled not by the internal system clock but by the reception and transmission clock, are reset, in an absence of a reset signal, by a reset signal which is emitted by the master processing component via an output interface circuit thereof.

6. The process as claimed in claim 1, wherein the synchronization signals are multiplex signals having individual synchronization signals for individual internal input and output interface circuits.

7. A process for maintaining microsynchronous parallel operation of duplicated information-processing units, comprising the steps of:

providing an internal processing clock for each unit, said internal processing clock of each unit being mutually synchronous with internal processing clock of other unit, said internal processing clock of each unit being independent of a clock used to receive information to be processed or used to transmit processed information results, providing each unit with a device for error monitoring of information received and of information results to be transmitted, temporarily storing information received by the units before being processed and temporarily storing corresponding result information, said temporarily storing step for maintaining microsynchronous parallel operation of said duplicated information-processing units, supplying by each of the units, if the information received or the result information to be transmitted are error free, a synchronization signal, indicating processing phase and derived from an internal system clock, to one another of the units, and synchronizing a start of a processing phase with the synchronization signal, said supplying step performed for maintaining microsynchronous parallel operation of said duplicated information-processing units; and preventing, in an absence of a synchronization signal, even if information is received correctly or if distorted information is received, information processing in the affected unit or, even if an undistorted information processing result is obtained, transmitting dummy information instead, said preventing step performed for maintaining microsynchronous parallel operation of said duplicated information-processing units.

* * * * *